Patented Feb. 27, 1945

2,370,278

UNITED STATES PATENT OFFICE 2,370,278

SYNTHETIC BINDING AGENTS AND THEIR USE

Gustav Widmer, Basel, and Willi Fisch, Binningen, Switzerland, assignors to Ciba Products Corporation, Hoboken, N. J.

No Drawing. Application December 11, 1941, Serial No. 422,594. In Switzerland August 1, 1936

5 Claims. (Cl. 51—298)

This application is a continuation-in-part of our application Serial No. 156,034, filed July 27, 1937, now U. S. Patent No. 2,318,121.

The present invention is concerned with the use of condensation products of amino-triazines and aldehydes as binding agents. It particularly relates to the use of said condensation products as binding agents for abrasives. It comprises the improved process of using said binding agents in the manufacture of abrasives as well as the improved abrasives themselves.

The use of artificial resins capable of being hardened, for example those from phenol and formaldehyde or urea and formaldehyde, as binding agents for abrasives is known. The resins have the advantage that they can easily be applied in an unhardened condition in the form of a solution, a powder or suspension and then hardened to convert them into a highly insoluble form. However, owing to various disadvantages their use in this field is limited.

The phenol resins are not useful in aqueous solution and when used in the manufacture of abrasives require usually a high temperature, viz. from 150 to about 180° C. for the hardening operation. In the form of a cold hardening mixture they require a large proportion of a hardening agent of an acid nature. Also the instability of the phenol resins to light is a serious disadvantage. Likewise urea resins which have the advantage of solubility in aqueous media require nearly as high a temperature for the hardening operation. In this case, indeed, cold hardening products, for example cold glue, are known but in comparison with the phenol resin glues they have a limited resistance to hot water, in particular the urea resins cannot be satisfactorily hardened with a weak acid, but always require a strong acid or strong acid salt.

The present invention relates to a process of making abrasives which minimizes or avoids the foregoing disadvantages by the use as a binding agent of the condensation products capable of being hardened which can be produced from formaldehyde and an aminotriazine, for example according to the process described in the co-pending application Ser. No. 68,355 (U. S. Patent No. 2,310,004) and U. S. Patent No. 2,197,357. These products have proved to be surprisingly reactive so that the binding agents made therefrom can be hardened or made insoluble in water at temperatures which are considerably below those at present used for other binding agents of the kind outlined above. It is true that both in the aforesaid application and patent it has already been said that the condensation products from formaldehyde and aminotriazines are useful as binding agents. However, no mention has been made of their use in the manufacture of abrasive articles.

It has now been found that these new condensation products can be used with great advantage as binding agents in the abrasive field under substantially milder conditions of temperature than was possible hitherto, particularly already at temperatures well below 100° C., as a binding agent which is stable not only to cold water but also to boiling water. Moreover, the abrasive articles obtained according to the present invention are characterized by a superior heat resistance and mechanical strength.

The process of manufacture of the new abrasives consists simply in mixing the aminotriazine-aldehyde condensation product, if necessary in presence of accelerators, with the agrasive material in suitably divided form, for instance as grit or in more finely divided form, after which the mixture is molded under pressure at a suitable temperature. If abrasive paper is to be made, the binding agent is applied suitably in form of a thick liquid on a paper- or textile-web, whereupon abrasive grit of suitable size of grain is sprayed thereon and then the web is dried at moderate temperature.

When the condensation product is employed in powder form, it is advantageous to use as low a quantity of liquid, for instance water, as possible. Preferably the abrasive grains are wetted with a very low quantity of water or alcohol and only then the resin powder is mixed in. The powder spreads on the moist surface of the grains and swells to a tough coating.

The speed of hardening of these new binding agents may be varied greatly by the use of accelerators. Such an accelerator may be basic, neutral or acid. As a rule accelerators of acid reaction are preferred. In presence of a small proportion of an accelerator the hardening operation can be performed at temperatures ranging between 70 and 90° C. or even at lower temperatures and the abrasive thus obtained will be remarkably fast to boiling water. Indeed abrasives which are glued with this material may be in contact with boiling water for days before they fall asunder by destruction.

In the presence of large proportions of the accelerator the hardening is so rapid as to occur even at room temperature, for instance on standing over-night. The quality of articles so obtained with respect to boiling water is of the same order as that of those obtained at higher temperatures which is surprisingly new.

The new binding agents may be used pure or in admixture with the usual filling and extending agents such as kaolin, gypsum, asbestos, barium sulfate or the like. The addition of water repelling substances such as paraffin or aluminium salts may in some cases be recommendable. Also softening or plastifying agents for instance of the type of alkyd resins may be added.

The new binding agents are advantageously produced in the form of dry preparations which may contain the binding agent, the filling agent, or other addition and if necessary the accelerator and the like in suitable admixture so that the user can convert the preparation into a liquid binding agent ready for use by simply mixing it with water. These dry preparations are quite suitable for storage, whereas liquid condensation products have generally a limited capacity for storage.

The condensation products or their components may be used either in aqueous medium or in presence of an organic solvent.

While the formaldehyde condensation products of 2.4.6-triamino-1.3.5-triazine (melamine) have proved particularly useful for the purpose of the present invention, the use of all the other condensation products forming the subject of the co-pending application Ser. No. 68,355 and U. S. Patent No. 2,197,357 is intended to be included in the present application, for instance the condensation products which contain an alcoholic component and are soluble in organic solvents. As an example of such a condensation product there may be mentioned the butanol ether of the methylol compound of 2.4.6-triamino-1.3.5-triazine.

The present invention includes the manufacture of abrasives of every kind, for instance abrasive paper, grinding discs, and the like.

The following examples illustrate the invention, the parts being by weight. The relationship between parts by weight and parts by volume is that which exists between the kilogram and the litre:

*Example 1*

50 parts of fine corundum powder having a grain of ⅛ mm. or finer, are kneaded with 7.5 parts of a water-soluble resin (obtained from 1 mol melamine and 3 mols formaldehyde) and 3 parts of water, which contains 10 grams of ammonium sulfate per 80 cc. of water, and then stamped into a round mold. The latter is then subjected in a press for 3 minutes at room temperature to a pressure of 180 kilos per square cm., the molded article is then removed and hardened for 16 hours at 80° C. A grinding disc of good strength is thus obtained.

The water-soluble melamine resin is prepared as follows:

126 parts of 2.4.6-triamino-1.3.5-triazine (melamine) are suspended while stirring in 300 parts by volume of neutral formaldehyde of 30 per cent. strength by volume and the suspension kept in the water bath, the internal temperature of which is 80° C. The triazine dissolves in a few minutes. The condensation is continued until a sample withdrawn, cooled and diluted with 3 parts by volume of water shows a milky turbidity which is normally the case in about half an hour. The mixture is now quickly cooled and evaporated in a vacuum at low temperature to a thick syrup and the latter is immediately dried in a vacuum chest in the form of thin layers and then ground. The condensation solution may alternatively be dried by spraying or in a roller dryer. The dried powder thus obtained can be stored well and is easily soluble in water.

*Example 2*

15 parts of the water-soluble melamine resin in powder form obtained according to Example 1 are stirred with 8 parts of an ammonium sulfate solution of 6 per cent. strength to form a smooth glue and spread on a textile web. Abrasive grains of suitable size (for instance ⅛–1/16 mm. diameter) are then strewn on the wet sticky layer and the web is dried at 80° C. After 1—2 hours the resin is entirely hardened and the abrasive grains are bonded with the support in a water-proof manner.

*Example 3*

100 parts of a corundum abrasive powder having a grain of 0.5–1 mm. are uniformly wetted with 2 parts of water and then well worked up with 14 parts of the melamine resin powder obtained according to Example 1. There is thus obtained a soft moist mass capable of being cold molded under a pressure of 100—200 kilos per square cm. and hardened at a gradually rising temperature.

*Example 4*

80 parts of the liquid melamine resin produced by boiling hexamethylol melamine with acidified butanol, neutralizing and distilling off the butanol in excess, viz. a product obtained about in the same manner as indicated in Example 9 of application Ser. No. 68,355, are diluted with 3 parts of butanol and then mixed with 600 parts of a coarse-grained corundum having a grain of 0.5–1 mm. diameter. Ultimately 40 parts of infusorial earth are kneaded into the sticky mass. The moist mass which is hardly sticky yet is stamped into a mold and subjected cold to a pressure of 100–200 kilos per square cm. The soft mass thus obtained is then hardened in the oven as usual at a gradually rising temperature of 80–140° C. The resin mixture thus employed can also be used for elastically fixing abrasive grains on paper webs and/or textile webs.

What we claim is:

1. Abrasive grit wetted with a solvent for an aminotriazine-aldehyde resin and bonded with a resin containing an aminotriazine-aldehyde condensation product.

2. An abrasive article comprising particles of abrasive and an aminotriazine-aldehyde resin cured in contact therewith.

3. An abrasive article comprising particles of abrasive and an aminotriazine-aldehyde resin cured in contact therewith by heating in the presence of an acid curing agent.

4. An abrasive article comprising particles of abrasive and a melamine-aldehyde resin cured in contact therewith.

5. An abrasive article comprising particles of abrasive and a melamine-formaldehyde resin cured in contact therewith.

GUSTAV WIDMER.
WILLI FISCH.